US007788920B2

(12) United States Patent
Keast

(10) Patent No.: US 7,788,920 B2
(45) Date of Patent: Sep. 7, 2010

(54) HYDRAULIC PUMP WITH CONTROL SYSTEM

(76) Inventor: Larry G. Keast, 9314 Livernois, Houston, TX (US) 77080

( * ) Notice: Subject to any disclaimer, the term of this patent is extended or adjusted under 35 U.S.C. 154(b) by 374 days.

(21) Appl. No.: 12/004,381

(22) Filed: Dec. 20, 2007

(65) Prior Publication Data

US 2009/0158725 A1 Jun. 25, 2009

(51) Int. Cl.
*F16D 31/02* (2006.01)
*F16D 39/00* (2006.01)

(52) U.S. Cl. .......................................... 60/493; 60/429

(58) Field of Classification Search ................... 60/428, 60/429, 465, 493
See application file for complete search history.

(56) References Cited

U.S. PATENT DOCUMENTS 3,872,671 A * 3/1975 Verlinde ...................... 60/493
4,716,728 A * 1/1988 Kakeya ....................... 60/493
5,058,383 A * 10/1991 Tsunemi et al. ............... 60/493
5,177,964 A * 1/1993 Tanaka et al. ................. 60/493
5,481,872 A * 1/1996 Karakama et al. ............. 60/428

* cited by examiner

*Primary Examiner*—Michael Leslie
(74) *Attorney, Agent, or Firm*—John R. Casperson

(57) ABSTRACT

A hydraulic motor is driven by a fixed displacement, three stage gear-type pump. The three equal displacement sections provide 3 equally-stepped flows so that the hydraulic motor can have three speeds. Valving and controls are provided for remote on-the-fly shifting of the speeds, automatic pump unloading in neutral, and adjustable maximum pressure. A closed loop system permits use of a relatively small reservoir. The contamination tolerance of the system is greater than that of variable displacement piston-type pumps typically used. Direct recirculation of hydraulic fluid is provided for unused speeds to permit hydraulic fluid to recirculate in the pump without doing work. A unique control circuit is provided to control the first speed valve in conjunction with a logic cartridge which controls hydraulic motor direction to permit fluid flow to the hydraulic motor to be stopped when coming to neutral without slamming the hydraulic motor and rotating drill pipe to a stop. The first speed valve also acts as a relief valve to provide a mechanism for adjusting maximum system pressure.

14 Claims, 4 Drawing Sheets

HYDRAULIC PUMP WITH CONTROL SYSTEM

FIELD OF THE INVENTION

In one aspect, this invention relates to a control system for a hydraulic pump. In another aspect, this invention relates to a method for operating a hydraulic pump.

BACKGROUND OF THE INVENTION

Hydraulic pumps are used in many applications. In the oil and gas industry, one application is use of a hydraulic pump to power a hydraulic motor to turn a drill pipe. A specific example of this application is a power swivel, which is used to turn the drill pipe while suspended in the drilling.

In power swivel applications, the pump is typically powered by a diesel engine or electric motor. The pumps in commercial use are usually infinitely variable displacement models which provide infinitely variable speed for the power swivel. However, these pumps are not particularly robust and are subject to failure, often by fluid contamination, if not adequately maintained by changing out the filters.

Gear pumps provide a much more robust and contamination friendly design, but their use has not been favored because of difficulties in controlling their output. A control system which permits good control would enable gear pumps to be used for power swivel applications. It is an object of this invention to provide such a control system.

SUMMARY OF THE INVENTION

In accordance with one embodiment of the invention, an apparatus is provided comprising a pump, a hydraulic motor, structure forming a flow path between the pump and the hydraulic motor including a flow rate controller and a directional control valve, and actuators for the flow rate controller and the directional control valve.

The pump provides a supply of pressurized hydraulic fluid, and is preferably a gear pump. The hydraulic motor is operable by supply of pressurized hydraulic fluid from the pump. The flow path structure carries the fluid between the pump and the hydraulic motor.

The hydraulic motor is a bidirectional hydraulic motor having a first bifunctional fluid port to supply hydraulic fluid to the hydraulic motor in forward drive and to exhaust fluid from the hydraulic motor in reverse drive and a second bifunctional fluid port to supply hydraulic fluid to the hydraulic motor in reverse drive and to exhaust fluid from the hydraulic motor in forward drive.

The directional control valves includes supply valves and exhaust valves of the type known in the hydraulic industry as the logic cartridge type.

The directional control valves are selectively settable in configurations for forward drive, reverse drive, and lock-up. In the forward drive configuration, hydraulic fluid is supplied from the hydraulic pump to the first bifunctional fluid port of the bidirectional hydraulic motor. In the reverse drive configuration, hydraulic fluid is supplied from the hydraulic pump to the second bifunctional fluid port of the bidirectional hydraulic motor. In the neutral lock-up configuration, hydraulic fluid is blocked to and from the bidirectional hydraulic motor.

The directional control valve is preferably mounted as an assembly to the casing of the pump.

The flow rate controller includes a first speed valve selectively settable in a flow output configuration or a recirculation configuration. In the flow output configuration, a single gear section output of hydraulic fluid is supplied through the flow path from the hydraulic pump to the hydraulic motor and provides a first speed for the hydraulic motor. In the recirculation configuration, hydraulic fluid bypasses the hydraulic motor and is returned to the hydraulic pump. The flow rate controller is preferably mounted as an assembly to the casing of the pump.

The actuator for the directional control valve is for simultaneously selectively setting the hydraulic motor supply valves and exhaust valves in cooperating configurations for forward drive, reverse drive, or lockup. The actuator is preferably mounted as an assembly to the flow rate controller.

The actuator for the flow rate controller preferably includes functionality for simultaneously setting the first speed valve in a recirculation configuration when the hydraulic motor supply valves and the hydraulic motor exhaust valves are set to neutral lockup configuration. The actuator is preferably mounted as an assembly to the pump casing.

This pump and control system is especially useful for drilling operations because it permits fluid flow to the hydraulic motor to be stopped when coming to neutral without slamming the motor and the rotating drill pipe to a stop, which could cause the drill pipe to become unthreaded or cause other damage. It also permits the driller to drill forward in a stop-start manner as is commonly required. The control system further permits use of the more-robustly designed gear pump for this particular application.

DETAILED DESCRIPTION OF THE PREFERRED EMBODIMENTS

Figure 1:
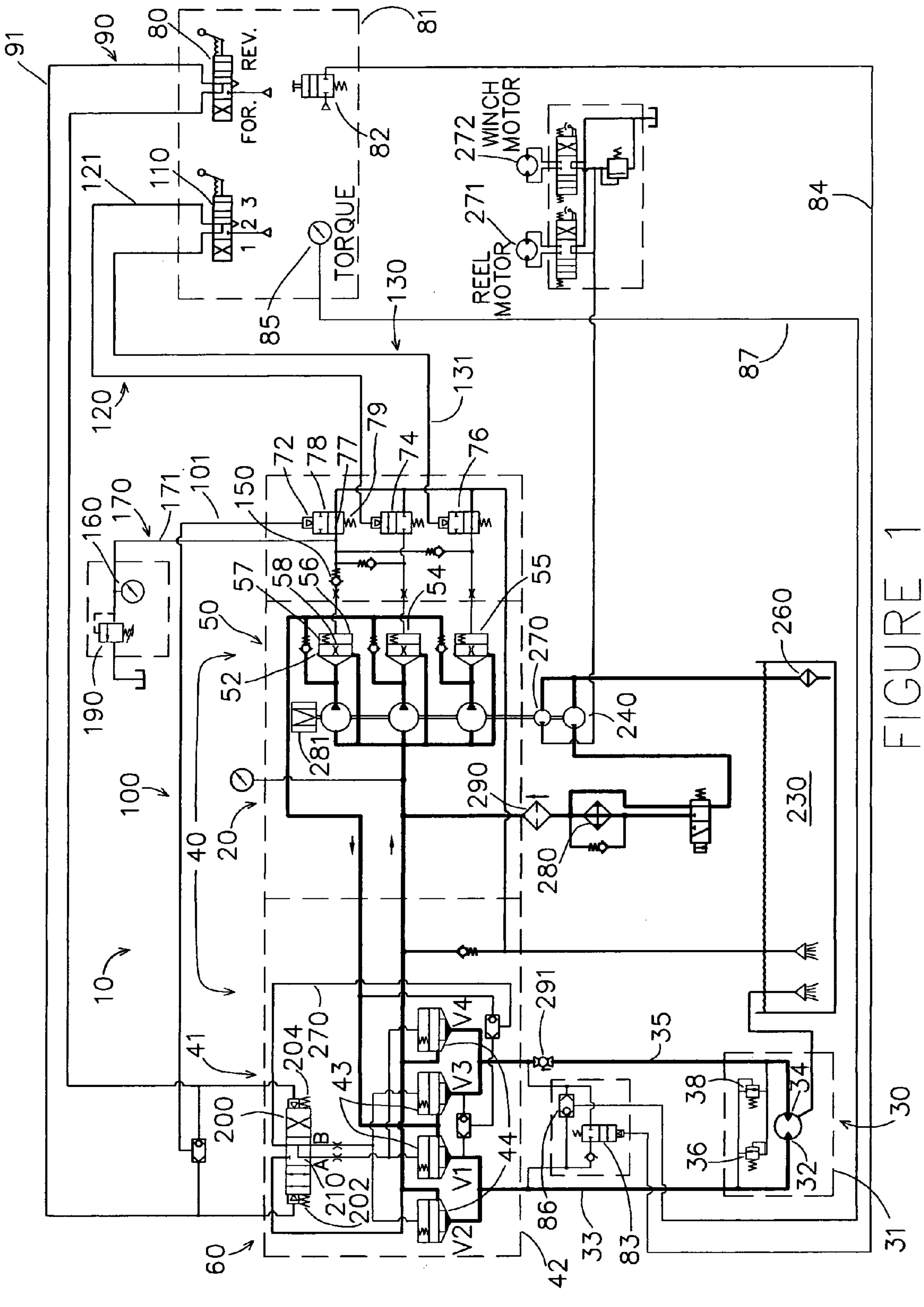
FIG. 1 is a schematic illustrating a control system according to certain aspects of the invention.

With reference to FIG. 1, an apparatus 10 comprises a pump 20 for providing a supply of pressurized hydraulic fluid, a hydraulic motor 30 operable by supply of pressurized hydraulic fluid from the pump 20, and structure 40 for forming a hydraulic fluid flow path between the pump 20 and the hydraulic motor 30.

The hydraulic motor 30 preferably comprises a power swivel 31 as used in the oil and gas drilling industry, although the invention would be generally applicable to most any bidirectional hydraulic motor driven application. The invention will be described hereinafter with reference to power swivel 31.

The structure 40 forming a hydraulic flow path between the pump 20 and the power swivel 31 includes a directional control valve 41 for reversing the direction of hydraulic fluid flow through the power swivel 31. In the illustrated embodiment, the directional control valve 41 includes a supply valve pair 43 including valves V1 and V3 and an exhaust valve pair 44 including valves V2 and V4. Preferably, both the supply valves 43 and the exhaust valves 44 are provided in the form of a 4-way valve assembly 42. The invention will be described hereinafter with reference to 4-way valve assembly 42.

The supply valves 43 in the 4-way valve assembly 42 are selectively settable in configurations to provide forward drive, reverse drive, and neutral lock-up for the power swivel 31. In forward drive, hydraulic fluid is supplied from the pump 20 to the first port 32 of the power swivel 31 via a line 33 extending between the 4-way valve assembly and the power swivel. In reverse drive, hydraulic fluid is supplied from the pump 20 to the second port 34 of the power swivel 31 via a line 35 extending between the 4-way valve assembly and the power swivel. In neutral lock-up, no hydraulic fluid is supplied to the power swivel 31.

The exhaust valves 44 of the 4-way valve assembly 42 are selectively settable in configurations to provide forward drive, reverse drive and neutral lock-up for power swivel 31. In forward drive, hydraulic fluid is exhausted from the second port 34 of the power swivel 31. In reverse drive, hydraulic fluid is exhausted from the first port 32 of the power swivel 31. In neutral lock-up, no hydraulic fluid is exhausted from the power swivel 31.

In the illustrated embodiment, the 4-way valve assembly 42 includes a first valve V1, a second valve V2, a third valve V3 and a fourth valve V4. The second valve V2 and the fourth valve V4 form the exhaust valves 44 and the first valve V1 and the third valve V3 form the supply valves 43. In forward drive, the second valve V2 and the third valve V3 are closed and the first valve V1 and the fourth valve V4 are open. In reverse drive, the first valve V1 and the fourth valve V4 are closed and the second valve V2 and the third valve V3 are open. In lock-up, the first valve V1, the second valve V2, the third valve V3, and the fourth valve V4 are all closed.

The valves V1, V2, V3, and V4 are preferably hydraulic logic cartridge valves which are spring biased to the closed position and have a 1.6:1 area ratio to provide a multiplier for the actuating fluid. The valves have a damping nose. An actuator 60 for these valves is a 4-way directional control valve, 3-position, spring centered, air operated, with pressure to both A and B out lines when in the center position.

The structure 40 forming a hydraulic flow path between the pump 20 and the power swivel 31 includes a flow rate controller 50 for controlling the flow rate of hydraulic fluid to the power swivel 31, and thus the speed of the power swivel 31. The flow rate controller 50 comprises a first speed valve assembly 52 selectively settable in configurations for flow output and flow recirculation. In flow output configuration, a first flow of hydraulic fluid is supplied through the hydraulic fluid flow path from the pump 20 to the power swivel 31. In recirculation, hydraulic fluid bypasses the power swivel 31 and is returned to the pump 20.

The 4-way valve actuator 60 for the 4-way valve assembly 42 is for simultaneously selectively setting the swivel supply valves 43 and the swivel exhaust valves 44 to matching configurations forward drive, reverse drive, and lock-up and signaling an actuator 72 for the first speed valve 52 to set the first speed valve in configuration for recirculation when the swivel supply valves 43 and the swivel exhaust valves 44 are set to lock-up.

In a preferred embodiment, the apparatus is controlled with a manually actuated shifter 80 with Forward, Neutral and Reverse positions. Preferably, the shifter is located on a remote control panel 81. A means 90, for example, pneumatic umbilical line 91, establishes a signal path from the shifter 80 to the 4-way valve actuator 60. Positioning the shifter in the Forward position signals the 4-way valve actuator 60 to simultaneously set the swivel supply valves 43 and the swivel exhaust valves 44 for forward drive. Positioning the shifter in the Neutral position signals the actuator 60 to simultaneously set the swivel supply valves 43 and the swivel exhaust valves 44 for lock-up. Positioning the shifter in the Reverse position signals the actuator 60 to simultaneously set the swivel supply valves 43 and the swivel exhaust valves 44 for reverse drive. The Neutral position on the shifter is preferably located between the Forward position and the Reverse position so that the Neutral position must be engaged to shift between Forward and Reverse.

The apparatus preferably further includes a means 100, for example, pneumatic line 101, for establishing a signal path from the shifter 80 to the actuator 72 for the first speed valve 52 so that the signal from the neutral position on the shifter further signals the actuator 72 for the first speed valve to set the first speed valve to recirculation configuration.

When the shifter is in the neutral position, the power swivel 31 is in neutral lock-up. To permit the power swivel to unwind, a torque release system is provided. The torque release system preferably comprises a manual actuator 82 positioned on the control panel 81, a cartridge valve 83 positioned to open and close a crossover flow line interconnecting lines 33 and 35 between the 4-way valve and the power swivel, and a signal line 84, such a pneumatic line, for conveying a signal from the actuator 82 to the cartridge valve 83. To provide an indication of torque, as well as an indication of when the torque has been released, the control panel 81 preferably further carries a torque gauge 85. A shuttle valve 86 is positioned in a second crossover flow line interconnecting the lines 33 and 35 between the 4-way valve and the power signal, and a hydraulic line 87 connects the shuttle valve and the gauge. In the illustrated embodiment, the crossover for the torque indicator system is positioned across the crossover for the torque release system.

In the illustrated embodiment, the hydraulic pump flow rate controller 50 further includes a second speed valve 54 selectively settable in configurations for flow output and flow recirculation. In second speed drive, a second flow of hydraulic fluid is supplied from the hydraulic pump 20, in combination with the first flow, to the power swivel 30. In recirculation, hydraulic fluid bypasses the power swivel 30 and is returned to the hydraulic pump 20. The apparatus is further provided with an actuator 74 for the second speed valve 54 and a manually actuated throttle 110 with at least first and second speed positions. A means 120, for example, pneumatic line 121, establishes a signal path from the throttle 110 to the actuator 74 for the second speed valve. The second speed position on the throttle 110 signals the actuator 74 to set the second speed valve 54 to the flow output configuration.

In a further preferred embodiment, the pump flow rate controller 50 further includes a third speed valve 55 selectively settable in configurations for flow output and flow recirculation. In the configuration for third speed drive, a third flow of hydraulic fluid, in combination with the first and second flows, is supplied from the hydraulic pump 20 to the power swivel 30. In recirculation, hydraulic fluid bypasses the power swivel 31 and is returned to the pump 20. The manually actuated throttle 100 further has a third speed position, and the apparatus further comprises a means 130, for example, pneumatic line 131, establishing a signal path from the throttle 110 to an actuator 76 for the third speed valve 55. The signal from the third speed position on the throttle 110 signals the actuator 76 for the third speed valve to set the third speed valve 55 in flow output configuration.

In the illustrated embodiment, the first speed valve 52 comprises a valve element 56 defining an orifice 58. The valve element is biased toward the flow output configuration by spring 57, for example. The actuator 72 for the first speed valve 52 comprises a shuttle 78 defining a relief passage 77 therethrough. The shuttle 78 is biased, such as by spring 79, toward a first position wherein the relief passage is in flow communication with the orifice 58 and is movable to a second position in response to a signal to break the communication. The apparatus further comprises a conduit structure 150 defining a hydraulic fluid flow path from the orifice 58 to the shuttle 78 so that the valve element 56 of the first speed valve 52 moves to the flow recirculation configuration when the shuttle is in the first position.

In a particularly preferred embodiment, the shifter 80 and the throttle 110 provide pneumatic signals and the signal from the neutral position on the shifter 110 received by the actuator 72 for the first speed valve is a null signal so that the shuttle 78 is spring biased in response thereto to the flow output configuration.

In a further preferred embodiment, the apparatus further comprises a pressure gauge 160 and a conduit structure 170, for example, hydraulic line 171, connecting the pressure gauge to the hydraulic fluid flow path 150 between the orifice 58 and the shuttle. To avoid overpressure conditions, a relief valve 190 is preferably operably positioned downstream of the gauge 160 to relieve pressure above a predetermined upper limit from the hydraulic line 171.

In the illustrated embodiment, the signal produced when the shifter is in the Neutral position is a null signal. The 4-way valve actuator 60 includes a shuttle 200 having a passage 210 therethrough which is spring biased responsive to the null signal to a neutral configuration (illustrated) which permits passage therethrough of hydraulic fluid to set the swivel supply valves 43 and the swivel exhaust valves 44 to the lock-up configuration, for example, by springs 202 and 204. A conduit 220 connects the 4-way valve actuator 60 with a conduit structure forming a hydraulic flow path between the supply valves 43 and the power swivel 31 to provide hydraulic fluid to the actuator 60 for setting the valves.

Further in the illustrated embodiment, the signal produced when the throttle 110 is in the second speed position (illustrated) is a null signal and the actuator 74 for the second speed valve is spring biased responsive to the null signal to set the second speed valve 54 in the configuration for flow output. The signal produced when the throttle 110 is in the third speed position is a positive signal and moves the actuator 55 against a spring bias to set third speed valve 55 in configuration for flow output.

The following features are not necessarily required in all embodiments of the invention but are described herein for the sake of completeness.

A hydraulic fluid reservoir 230 is provided which in the invention may be sized smaller than is usually the case with fixed displacement pumps because of the unusual closed loop configuration of the invention.

A charge pump 240 draws fluid filtered by strainer 260 from the reservoir 20 and charges the main pump 20. An auxiliary pump 270 is provided to power optional features such as the hose reel motor 271 and winch motor 272. Charge fluid from the pump 240 is cooled in cooler 280, filtered in filter 290, combined with fluid returning to the pump from the swivel 31, and the combined flows are charged to the pump 20. All pumps can be powered from a single shaft by engine 281, such as a diesel engine. The cooler can be positioned adjacent to the engine radiator. An air compressor can be driven by the motor to charge an air reservoir for powering the controls.

Relief valves 36 and 38 are provided on the power swivel pressure lines to avoid overpressure conditions.

Although the actuating signals in the illustrated embodiment are pneumatic, it is to be understood that electrical, hydraulic, or mechanical linkages could be used if desired. It is preferred however, that the signals not rely on the same power source as the pump, as a power failure to the main motor could result in unwinding of the torque in the drill pipe without the ability to intervene.

The pump 20 is preferably a fixed displacement, 3-stage gear pump having three equal displacement sections so that the hydraulic motor can have three speeds. The pump flow rate controller 50 and recirculation lines are preferably positioned within the pump casing for compactness and to reduce energy loss and heat buildup. The 4-way valve assembly 42 is also preferably integral with the pump as is the conduit which supplies fluid from the pump to the 4-way valve assembly.

Figure 2:
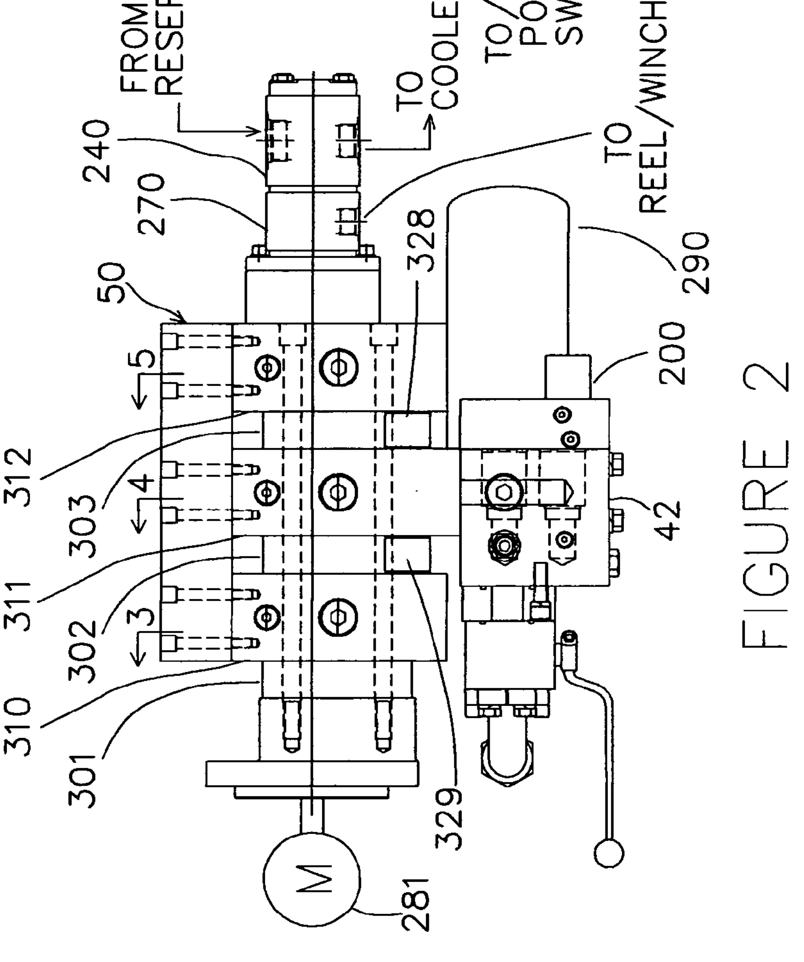
FIG. 2 illustrates a unified pump and valve assembly from a top view

With reference to FIG. 2, a unified pump and valve assembly is shown from a top view. An engine 281, for example, a diesel engine, drives a serially arranged gear pump assembly having a first gear section 301, a second gear section 302, and a third gear section 303. As illustrated, the unit also includes auxiliary gear pump module 270 and charge gear pump module 240. The engine 281 also drives an air compressor, not shown, which discharges into a reservoir tank to power the control system. A first manifold/valve module 310 is positioned adjacent the first gear section 301, between the first gear section 301 and the second gear section 302, a second manifold/valve module 311 is positioned adjacent the second gear section 302, between the second gear section 302 and the third gear section 303, and a third manifold/valve module 312 is positioned adjacent the third gear section 303, between the third gear section 303 and the auxiliary gear pump module 270. The pump flow controller 50 as well as the four-way valve assembly 42 is operably associated with the manifold/valve modules.

Figure 5:
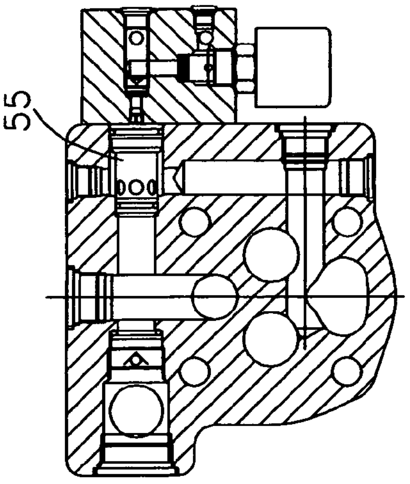
FIG. 5 is a cross sectional view of the third manifold/valve module 312 along cut line 5 in FIG. 2.
Figure 4:
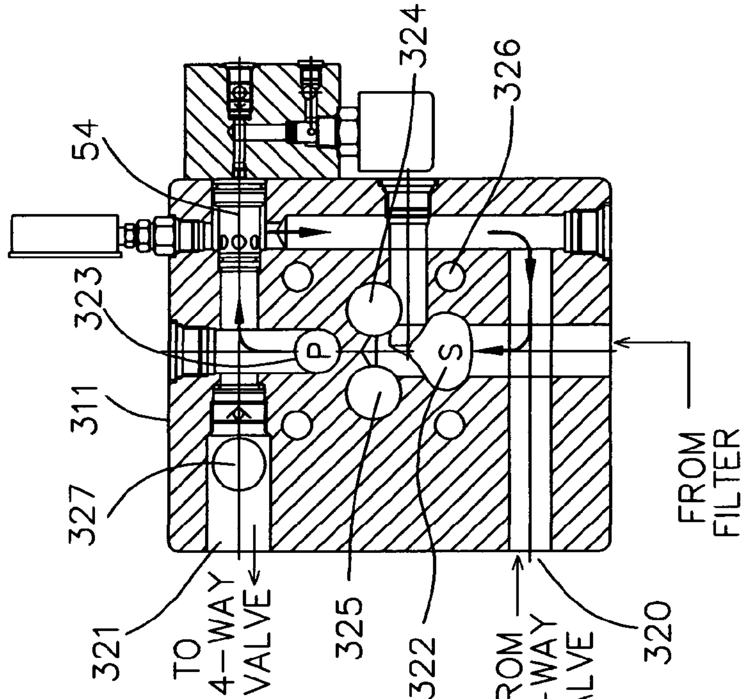
FIG. 4 is a cross sectional view of the second manifold/valve module 311 along cut line 4 in FIG. 2.
Figure 3:
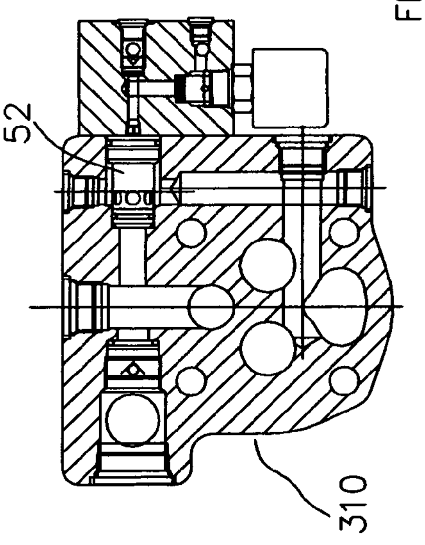
FIG. 3 is a cross sectional view of the first manifold/valve module 310 along cut line 3 in FIG. 2.

FIG. 3 is a cross sectional view of the first manifold/valve module 310 along cut line 3 in FIG. 2. FIG. 4 is a cross sectional view of the second manifold/valve module 311 along cut line 4 in FIG. 2. FIG. 5 is a cross sectional view of the third manifold/valve module 312 along cut line 5 in FIG. 2. FIG. 4 will be described first.

The second manifold/valve module has an inlet 320 receiving flow from the 4-way valve assembly 42 and an outlet 321 for discharging flow to the 4-way valve assembly 42. A suction chamber 322 draws fluid from the inlet 320 by action of the gears in adjacent gear section 302. The gear section 302 has a suction chamber passage corresponding the chamber 322 passing through it adjacent to the draw-in convergence point of the gears and supplying the suction chamber in the manifold/valve module 310 with fluid. The gear section 302 discharges into a high pressure port 323 of the manifold/valve module 311. When the second speed valve 54 is in the recirculate position, fluid flow is as indicated by the arrows, back to the suction chamber 322. When the second speed valve is in the second speed position, fluid flow is out port 321, to the 4-way valve. The manifold/valve module has a transverse borehole 324 for passage of the gear section drive shaft, and a transverse borehole 325 for passage of the gear section idler shaft. Boreholes 326 are provided for through bolts to hold the assembly of modules together.

An opposed pair of transverse passages 327 open into the manifold/valve module 311 near the discharge 321 for receiving fluid flow from the manifold/valve modules 310 and 312. As shown in FIG. 2, a conduit 329 carries high pressure fluid, when present, from the manifold/valve module 310 to the manifold valve module 311 and a conduit 328 carries high pressure fluid, when present, from the manifold/valve module 312 to the manifold/valve module 312.

The manifold/valve module 310 shown in FIG. 3, and the manifold/valve module 312 shown in FIG. 5 are constructed similarly to the manifold/valve module 311 shown in FIG. 4. Flow to recirculation or discharge in the manifold/valve module 310 is controlled by the first speed valve 52. Flow to recirculation or discharge in the manifold valve module 312 is controlled by the third speed valve 55. Separator plates (not shown) direct fluid flow from the gear sections into the appropriate manifold valve modules.

Figure 6:
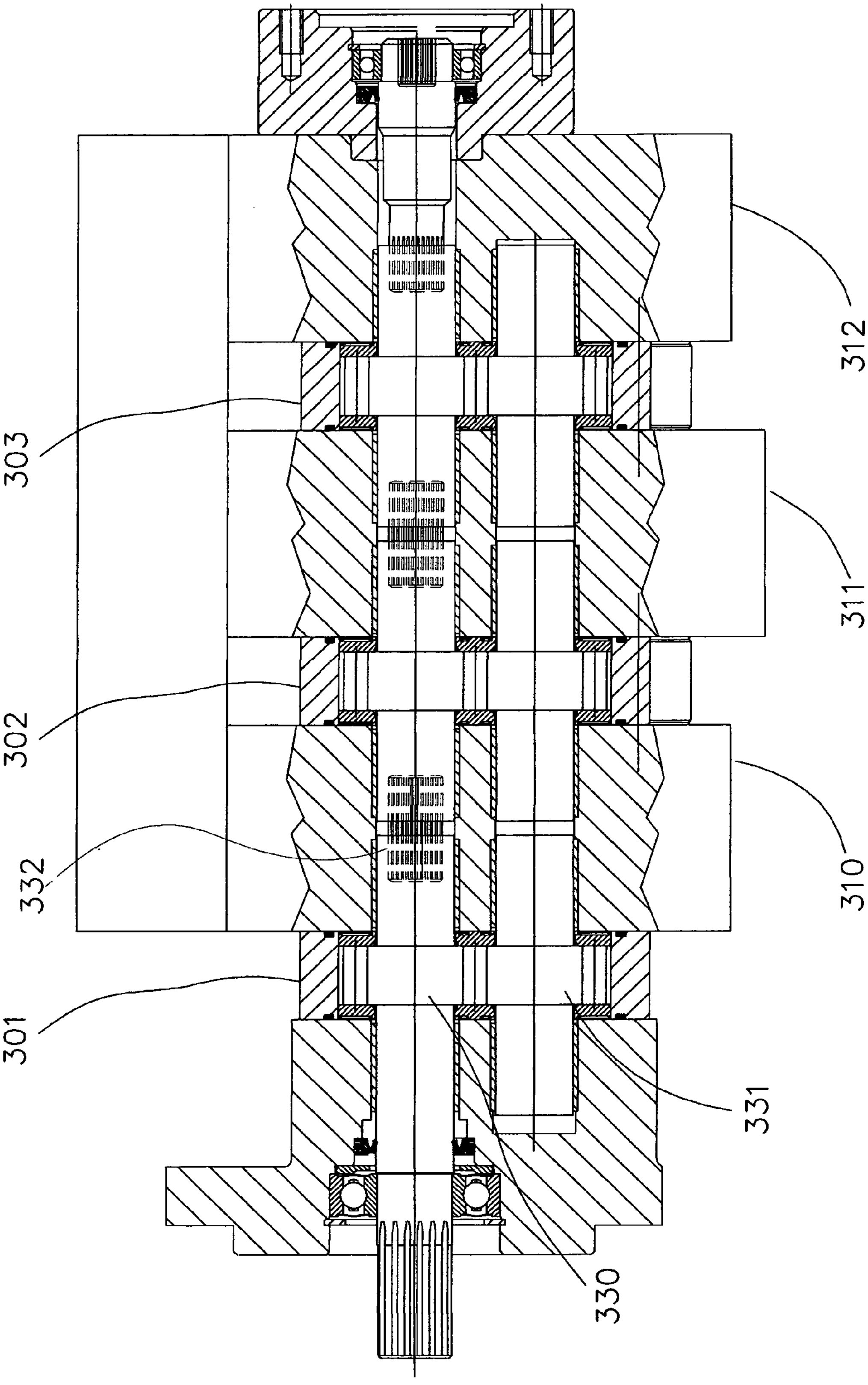
FIG. 6 is a cross-sectional view of a portion of the apparatus shown in FIG. 2, viewed from the side.

FIG. 6 is a cross-sectional view of a portion of the apparatus shown in FIG. 2, viewed from the side. Each gear section 301, 302, 303 contains a drive gear 330/idler gear 331 pair for driving the fluid. The drive gears are carried on splined drive shaft sections 332 to facilitate assembly.

Figure 7:
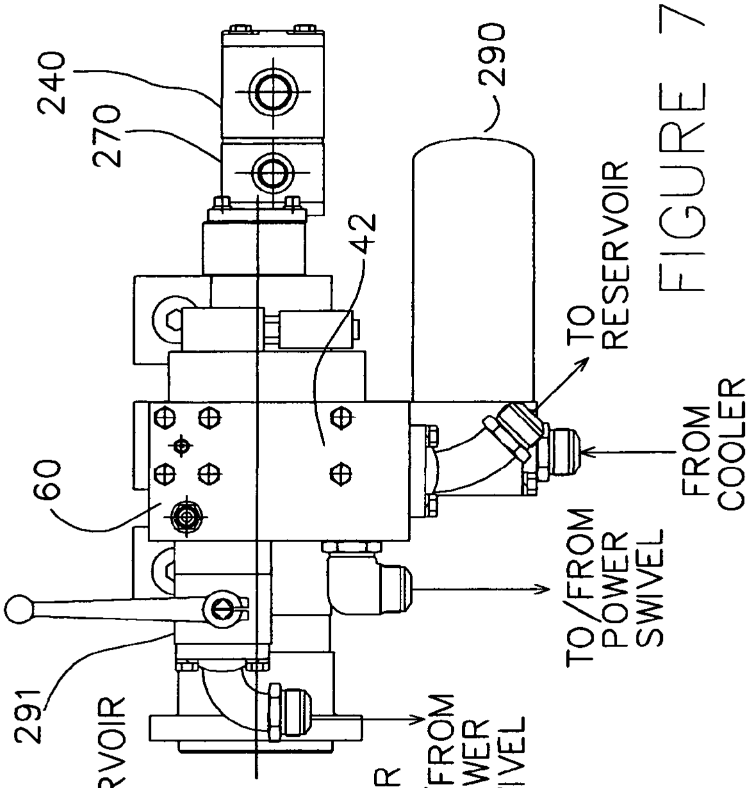
FIG. 7 is a side view of the apparatus shown in FIG. 2 showing the main inlets and outlets for the integrated unit.

FIG. 7 is a side view of the apparatus shown in FIG. 2 showing the main inlets and outlets for the integrated unit.

The apparatus of the invention can be used by setting the swivel supply valves 43 and the swivel exhaust valves 44 in configuration for forward drive, setting the first speed valve 52 in flow output configuration, and pumping pressurized hydraulic fluid to the power swivel 31 to drive the power swivel in a forward direction.

The apparatus of the invention can also be used by setting the swivel supply valves 43 and the swivel exhaust valves 44 in matching configurations for lock-up, setting the first speed valve 52 in configuration for recirculation, and pumping pressurized hydraulic fluid into a return line to the pump 20 which bypasses the power swivel 31.

The apparatus of the invention can be further used by setting the swivel supply valves 43 and the swivel exhaust valves 44 in matching configurations for forward drive, setting the first speed valve 52 in configuration for flow output, setting the second speed valve 54 in configuration for flow output, and pumping pressurized hydraulic fluid to the power swivel 31 to drive the power swivel 31 in a forward direction.

In the preferred embodiment, the pump and its associated valves and remote controls work together as one invention. The control panel arrangement uses identical three-position levers (F-N-R and 1-2-3) so that even an untrained operator has no difficulty understanding it. This is made possible by the comprehensive control circuitry, which permits smooth, seamless, on the fly shifting similar to a car transmission. When selecting neutral, the pump flow and the rotating string of drill pipe must come to a stop rapidly, but not harshly enough to cause damage or a safety concern. Also, when the neutral position is engaged with the pump operating at high pressure, that pressure must be maintained to prevent the drill pipe from freewheeling out of control in the reverse direction. The circuitry provides for these functions with conventional, time-tested, readily available components.

The first speed valve with its control circuitry provides three important functions, enabling motor speed control, maximum pressure adjustment, and pump unloading when in neutral without slamming the motor to a stop, permitting out of control backspinning, or generating heat buildup in the hydraulic fluid. Motor speed control is provided by closing the first speed valve to provide full flow from the first section of the pump for motor first speed. At this time, the second and third speed valves are open to allow hydraulic fluid to recirculate in the pump without doing work or adding to motor speed. Maximum pressure control is provided by a remote relief valve controlling the first speed valve to provide that additional function. Pump unloading in neutral is a necessary function and is a design challenge because the gear pump is a fixed displacement pump so mechanically has no neutral or zero displacement position. Nonetheless, the motor must be positively stopped by moving a lever to a neutral position without slamming the motor and rotating drill pipe to a stop. Additionally, when stopped in neutral, the pump cannot generate heat or consume power as would be the result if a typical closed center directional control valve with a relief valve were used. Using a conventional open center directional control valve would permit the drill motor and pipe to spin rapidly backwards when moved to neutral, and also would not permit the driller to operate in a stop and go manner when required. Alternately, using a conventional closed center directional control valve would slam the drill motor and pipe to a stop when moving to neutral. The disclosed first speed valve with control circuitry provides the needed functions without the stated disadvantages.

While certain preferred embodiments of the invention have been described herein, the invention is not to be construed as being so limited, except to the extent that such limitations are found in the claims.

I claim:

1. Apparatus comprising a pump for providing a supply of pressurized hydraulic fluid, and structure forming a hydraulic fluid flow path between the pump and a bidirectional hydraulic motor, wherein the structure forming a hydraulic flow path between the pump and the bidirectional hydraulic motor comprises hydraulic motor direction control valves selectively settable, by use of a manually actuated shifter, in configurations for forward drive, reverse drive, and neutral lock-up, of the bidirectional hydraulic motor, wherein in forward drive configuration, hydraulic fluid is supplied from the hydraulic pump to a first bifunctional fluid port of the bidirectional hydraulic motor, wherein in reverse drive configuration, hydraulic fluid is supplied from the hydraulic pump to a second bifunctional fluid port of the bidirectional hydraulic motor, and wherein in neutral lock-up configuration, no hydraulic fluid is supplied to the bidirectional hydraulic motor, and a pump flow rate controller including a first speed valve selectively settable in configurations for flow output or flow recirculation, wherein in flow output configuration, a first speed flow of hydraulic fluid is supplied through the hydraulic fluid flow path from the hydraulic pump to the bidirectional hydraulic motor, and wherein in recirculation configuration, hydraulic fluid bypasses the bidirectional hydraulic motor and is returned to the hydraulic pump;

said apparatus further comprising an actuator for the hydraulic motor direction control valves for simultaneously selectively setting the valves in cooperating configurations for forward drive, reverse drive, or lock-up;

an actuator for the first speed valve for simultaneously setting the first speed valve in recirculation configuration when the hydraulic motor direction control valves are set in neutral lockup configuration, and means establishing a signal path from the shifter to the actuator for the first speed valve, wherein a signal from the neutral position on the shifter further signal the actuator for the first speed valve to set the first speed valve in configuration for recirculation.

2. Apparatus as in claim 1 further comprising

Forward, Neutral and Reverse positions on the manually actuated shifter, and means establishing a signal path from the shifter to the actuator for the hydraulic motor direction control valves, wherein positioning the shifter in the Forward position signals the actuator for the hydraulic motor direction control valves to simultaneously set the hydraulic motor direction control valves in configuration for forward drive, wherein positioning the shifter in the Neutral position signals the actuator for the hydraulic motor direction control valves to simultaneously set the hydraulic motor direction control valves in configuration for neutral lockup, wherein positioning the shifter in the Reverse position signals the actuator for the hydraulic motor direction control valves to simultaneously set the hydraulic motor direction control valves in configuration for reverse drive, and and wherein the bidirectional hydraulic motor comprises a rotary motor.

3. Apparatus comprising a pump for providing a supply of pressurized hydraulic fluid, and structure forming a hydraulic fluid flow path between the pump and a bidirectional hydraulic motor, wherein the structure forming a hydraulic flow path between the pump and the bidirectional hydraulic motor comprises hydraulic motor direction control valves selectively settable in configurations for forward drive, reverse drive, and neutral lock-up, of the bidirectional hydraulic motor, wherein in forward drive configuration, hydraulic fluid is supplied from hydraulic pump to a first bifunctional fluid port of the bidirectional hydraulic motor, wherein in reverse drive configuration, hydraulic fluid is supplied from the hydraulic pump to a second bifunctional fluid port of the bidirectional hydraulic motor, and wherein in neutral lock-up configuration no hydraulic fluid is supplied to the bidirectional hydraulic motor, and a pump flow rate controller including a first speed valve selectively settable in configurations for flow output or flow recirculation, wherein in flow output configuration, a first speed flow of hydraulic fluid is supplied through the hydraulic fluid flow path from the hydraulic pump to the bidirectional hydraulic motor, and wherein in recirculation configuration, hydraulic fluid bypasses the bidirectional hydraulic motor and is returned to the hydraulic pump;

said apparatus further comprising an actuator for the hydraulic motor direction control valves for simultaneously selectively setting the valves in cooperating configurations for forward drive, reverse drive, or lock-up; and an actuator for the first speed valve for simultaneously setting the first speed valve in recirculation configuration when the hydraulic motor direction control valves are set in neutral lockup configuration, a manually actuated shifter with Forward, Neutral and Reverse positions, means establishing a signal path from the shifter to the actuator for the hydraulic motor direction control valves wherein positioning the shifter in the Forward position signals the actuator for the hydraulic motor direction control valves to simultaneously set the hydraulic motor direction control valves in configuration for forward drive, wherein positioning the shifter in the neutral position signals the actuator for the hydraulic motor direction control valves to simultaneously set the hydraulic motor direction control valves in configuration for neutral lockup, wherein positioning the shifter in the Reverse position signals the actuator for the hydraulic motor direction control valves to simultaneously set the hydraulic motor direction control valves in configuration for reverse drive, said apparatus further comprising means establishing a signal path from the shifter to the actuator for the first speed valve, wherein the signal from the neutral position on the shifter further signals the actuator for the first speed valve to set the first speed valve in configuration for recirculation.

4. Apparatus as in claim 3 wherein the pump flow rate controller further includes a second speed valve selectively settable in configurations for flow output or flow recirculation, wherein in the flow output configuration, a second flow of hydraulic fluid is supplied from the hydraulic pump to the hydraulic motor, wherein in the recirculation configuration, hydraulic fluid bypasses the hydraulic motor and is returned to the hydraulic pump, said apparatus further comprising an actuator for the second speed valve, a manually actuated control with at least first and second speed positions, means establishing a signal path from the control to the actuator for the second speed valve, wherein the second speed position on the control signals the actuator for the second speed valve to set the second speed valve in flow output configuration.

5. Apparatus as in claim 4 wherein the pump flow rate controller further includes a third speed valve selectively settable in configurations for flow output or flow recirculation, wherein in the flow output configuration, a third flow of hydraulic fluid is supplied from the hydraulic pump to the hydraulic motor, wherein in recirculation configuration, hydraulic fluid bypasses the hydraulic motor and is returned to the hydraulic pump, and the manually actuated control further has a third speed position, said apparatus further comprising structure establishing a signal path from the control to the actuator for the third speed valve, wherein a signal from the third speed position on the control signals the actuator for the third speed valve to set the third speed valve in the flow output configuration.

6. Apparatus as in claim 4 wherein the hydraulic motor direction control valves comprise hydraulic motor supply valves and hydraulic motor exhaust valves in the form of a multiple valve assembly comprising a first valve, a second valve, a third valve and a fourth valve, with the second valve and the fourth valve forming the exhaust valves and the first valve and the third valve forming the supply valves, wherein in the forward drive configuration, the second valve and the third valve are closed, and the first valve and the fourth valve are open, wherein in the reverse drive configuration, the first valve and the fourth valve are closed, the second valve and the third valve are open, and wherein in the neutral lock-up configuration, the first valve, the second valve, the third valve, and the fourth valve are all closed.

7. Apparatus as in claim 6 wherein the pump comprises a fixed displacement, 3-stage gear pump having three equal displacement sections so that the hydraulic motor can have three speeds.

8. Apparatus as in claim 6 wherein the first speed valve comprises a valve element defining an orifice, said valve element being biased toward the flow output configuration, the actuator for the first speed valve comprises a shuttle having a relief passage therethrough, said shuttle being biased toward a first position, wherein the relief passage is in flow communication with the orifice and is movable to a second position in response to a signal to break said flow communication, said apparatus further comprising structure defining a hydraulic fluid flow path from the orifice and the shuttle so that the valve element of the first speed valve moves to the recirculation configuration when the shuttle is in the first position.

9. Apparatus as in claim 8 wherein the manually actuated shifter and the manually actuated control provide pneumatic signals and the signal from the neutral position on the shifter received by the actuator for the first speed valve is a null signal so that the shuttle is spring biased in response thereto to the first position.

10. Apparatus as in claim 9 further comprising a pressure gauge, a conduit connecting the pressure gauge to the hydraulic fluid flow path between the orifice and the shuttle, and a relief valve operably positioned to relieve pressure above a predetermined upper limit from the conduit connecting the pressure gauge to the hydraulic fluid flow path between the orifice and the shuttle.

11. Apparatus as in claim 8 wherein the signal produced when the shifter is in the Neutral position is a null signal and the actuator for the hydraulic motor supply valves and the hydraulic motor exhaust valves include a shuttle having a passage therethrough which is spring biased responsive to the null signal to a neutral configuration which permits passage therethrough of hydraulic fluid to set the hydraulic motor supply valves and the hydraulic motor exhaust valves to a lock-up configuration.

12. Apparatus as in claim 4 wherein the signal produced when the manually actuated control is in the second speed position is a null signal and the actuator for the second speed valve is spring biased responsive to the null signal to set the second speed valve in the flow output configuration.

13. Apparatus as in claim 5 wherein the signal produced when the control is in the third speed position is a positive signal and moves the actuator against a spring bias to set the third speed valve in flow output configuration.

14. Apparatus as in claim 3 wherein the bidirectional hydraulic motor is operable by supply of pressurized hydraulic fluid from the pump, and has the first bifunctional fluid port to supply hydraulic fluid to the hydraulic motor in forward drive and to exhaust fluid from the hydraulic motor in reverse drive and the second bifunctional fluid port to supply hydraulic fluid to the hydraulic motor in reverse drive and to exhaust fluid from the hydraulic motor in forward drive.

* * * * *